US006633714B2

(12) United States Patent
de Montmorillon et al.

(10) Patent No.: US 6,633,714 B2
(45) Date of Patent: Oct. 14, 2003

(54) OPTICAL FIBER FOR WAVELENGTH DIVISION MULTIPLEX TRANSMISSION SYSTEMS

(75) Inventors: Louis-Anne de Montmorillon, Paris (FR); Pascale Nouchi, Maisons-Laffitte (FR); Ludovic Fleury, Bois D'Arcy (FR); Pierre Sillard, Le Chesnay (FR); Florent Beaumont, Honorine (FR); Maxime Gorlier, Paris (FR)

(73) Assignee: Alcatel, Paris (FR)

( * ) Notice: Subject to any disclaimer, the term of this patent is extended or adjusted under 35 U.S.C. 154(b) by 167 days.

(21) Appl. No.: 09/938,532

(22) Filed: Aug. 27, 2001

(65) Prior Publication Data

US 2002/0054743 A1 May 9, 2002

Related U.S. Application Data

(63) Continuation-in-part of application No. 09/788,562, filed on Feb. 21, 2001.

(30) Foreign Application Priority Data

Feb. 24, 2000 (FR) .............................................. 00 02316
Aug. 23, 2001 (FR) .............................................. 01 11047

(51) Int. Cl.$^7$ ................................................. G02B 6/02
(52) U.S. Cl. ....................................... 385/124; 385/123
(58) Field of Search ................................... 385/123, 124, 385/125, 126, 127; 359/124, 115

(56) References Cited

U.S. PATENT DOCUMENTS 6,396,987 B1 * 5/2002 de Montmorillon et al. ..... 385/212
6,459,839 B1 * 10/2002 Sauvageon et al. ......... 385/123

* cited by examiner

Primary Examiner—Euncha Cherry
(74) Attorney, Agent, or Firm—Sughrue Mion, PLLC

(57) ABSTRACT

An optical fiber exhibiting monomode behavior in-cable over a range from 1300 nm to 1625 nm and having, at a wavelength of 1550 nm: a dispersion from 5 to 11 ps/(nm.km); a ratio between dispersion and dispersion slope from 250 nm to 370 nm; a derivative of effective surface area with respect to wavelength less than or equal to 0.14%/nm; a chromatic dispersion cancellation wavelength $\lambda_0$ less than or equal to 1370 nm; and an effective surface area greater than or equal to 50 $\mu m^2$. The proposed criteria limit variations in non-linear effects in the fiber over a wide range of wavelengths and limit the dispersion to be compensated; also, the fiber can be compensated in a transmission system by chromatic dispersion compensating fiber used conventionally for stepped index fiber. The limit on the effective surface area slope avoids the need to treat individually the various wavelengths used in the transmission system.

22 Claims, 1 Drawing Sheet

OPTICAL FIBER FOR WAVELENGTH DIVISION MULTIPLEX TRANSMISSION SYSTEMS

This is a Continuation-in-Part of application Ser. No. 09/788,562 filed Feb. 21, 2001.

The present invention relates to the field of transmission via optical fibers and more specifically to compensating chromatic dispersion and chromatic dispersion slope in optical fiber transmission systems.

BACKGROUND OF THE INVENTION

The index profile of optical fibers is generally described by the shape of the graph of the function that relates the refractive index of the fiber and its radius. It is conventional to plot the distance r from the center of the fiber on the abscissa axis and the difference between the refractive index and the refractive index of the cladding of the fiber on the ordinate axis. The expressions "step" index profile, "trapezium" index profile and "triangle" index profile are therefore used with reference to graphs that are respectively step-shaped, trapezium-shaped and triangular. These curves are generally representative of the theoretical or set point profile of the fiber and fiber fabrication constraints can yield a significantly different profile.

It advantageous to manage chromatic dispersion in new high bit rate wavelength division multiplexed transmission networks, especially for bit rates greater than or equal to 40 Gbit/s or 160 Gbit/s; the objective, in order to limit pulse widening, is to obtain substantially zero cumulative chromatic dispersion over the link for all wavelengths of the multiplex. A cumulative dispersion value of a few tens of ps/nm is generally acceptable. It is also beneficial to avoid zero values of the local chromatic dispersion, for which the non-linear effects are strongest, in the vicinity of wavelengths used in the system. Furthermore, to prevent or limit distortion between multiplex channels, it is also beneficial to limit the cumulative chromatic dispersion slope over the range of the multiplex. The chromatic dispersion slope is conventionally defined as the derivative of chromatic dispersion with respect to wavelength. Finally, it is also necessary to take account of the fact that the amplitude of non-linear effects in a fiber is inversely proportional to the effective surface area of the fiber. To limit non-linear effects, the effective surface area should therefore ideally be as high as possible. However, some non-linear effects, such as the Raman effect, are useful for improving the margins of the transmission system.

Stepped index fibers, also known as single mode fibers (SMF), are conventionally used as line fibers in optical fiber transmission systems. The applicant's ASMF 200 stepped index monomode fiber has a chromatic dispersion cancellation wavelength $\lambda_0$ from 1300 to 1320 nm and a chromatic dispersion less than or equal to 3.5 ps/(nm.km) in a range from 1285 to 1330 nm and of the order of 17 ps/(nm.km) at 1550 nm. The chromatic dispersion slope at 1550 nm is of the order of 0.06 ps/(nm$^2$.km). This fiber typically has a chromatic dispersion to chromatic dispersion slope ratio C/C' from 250 to 370 nm at 1550 nm. This fiber has an effective surface area of around 80 $\mu$m$^2$ at 1550 nm.

Dispersion shifted fibers (DSF) have also become available. Non-zero dispersion shifted fibers (NZ-DSF+) are dispersion shifted fibers having a positive non-zero chromatic dispersion at the wavelengths at which they are used, typically around 1550 nm. At these wavelengths these fibers have a low chromatic dispersion, typically less than 11 ps/(nm.km) at 1550 nm, and a chromatic dispersion slope from 0.04 to 0.1 ps/(nm$^2$.km).

The document FR-A-2 790 107 proposes a line fiber especially suitable for dense wavelength division multiplex transmission with a channel spacing of 100 GHz or less and a bit rate per channel of 10 Gbit/s; at a wavelength of 1550 nm, this fiber has an effective surface area greater than or equal to 60 $\mu$m$^2$, a chromatic dispersion from 6 to 10 ps/(nm.km), and a chromatic dispersion slope less than 0.07 ps/(nm$^2$.km). At 1550 nm the applicant's TeraLight fiber typically has a chromatic dispersion of 8 ps/(nm.km) and a chromatic dispersion slope of 0.058 ps/(nm$^2$.km). The ratio of chromatic dispersion to chromatic dispersion slope of this fiber is 140 nm. This fiber has an effective surface area $S_{eff}$ of the order of 65 $\mu$m$^2$ and an effective surface area slope of the order of 0.17%/nm. The document FR-A-2 795 828 describes a dispersion compensating fiber suitable for this line fiber.

Using short lengths of dispersion compensating fiber (DCF) to compensate chromatic dispersion and chromatic dispersion slope in SMF or NZ-DSF+ used as line fibers is known in the art. DCF are described in various patents. At a wavelength in the vicinity of 1550 nm they have a negative chromatic dispersion to compensate the cumulative chromatic dispersion in the line fiber, and they can also have a negative chromatic dispersion slope to compensate the positive chromatic dispersion slope of the line fiber. The document U.S. Pat. No. 5,568,583 and the document U.S. Pat. No. 5,361,319 propose a DCF for compensating chromatic dispersion in an SMF which has dispersion of the order of 17 ps/(nm.km) at 1550 nm. Dispersion compensating fibers are generally more costly than line fibers and have a high attenuation.

It is therefore beneficial to have a line fiber that requires as short as possible a length of dispersion compensating fiber; another technical problem is to obtain a fiber enabling transmission over as wide a band as possible.

French patent application 00 02 316 filed Feb. 24, 2000 by the applicant, whose title in translation is "An optical fiber exhibiting monomode behavior in-cable for wavelength division multiplex optical fiber transmission networks", describes an optical fiber which is used as line fiber and whose chromatic dispersion is compensated by the kind of dispersion compensating fiber conventionally used for a stepped index fiber. At a wavelength of 1550 nm, this fiber has a chromatic dispersion from 5 to 11 ps/(nm.km), a ratio of chromatic dispersion to chromatic dispersion slope from 250 to 370 nm, an effective surface area at least equal to 50 $\mu$m$^2$, and a ratio of the square of the effective surface area to the chromatic dispersion slope greater than 80 000 $\mu$m$^4$.nm$^2$.km/ps. The above patent application does not refer to the effective surface area slope of the fiber and does not indicate the advantages that such a slope can have.

OBJECTS AND SUMMARY OF THE INVENTION

The invention proposes a fiber that simplifies wavelength management. It can in particular be used as line fiber in wavelength division multiplex transmission systems; the line fiber can have its dispersion compensated by a shorter length of dispersion compensating fiber than a prior art SMF. Also, this fiber is suitable for use over a wide band without significant variations in the transmission properties of the fiber.

To be more precise, the invention proposes an optical fiber having, at a wavelength of 1550 nm, a chromatic dispersion C from 5 to 11 ps/(nm.km), a ratio C/C' of chromatic dispersion to chromatic dispersion slope from 250 to 370 nm, a derivative $S'_{eff}$ of effective surface area with respect to wavelength less than 0.14%/nm, a chromatic dispersion cancellation wavelength $\lambda_0$ less than or equal to 1370 nm and an effective surface area greater than or equal to 50 $\mu m^2$.

The fiber advantageously also has one or more of the following optical characteristics:

- it exhibits monomode behavior in-cable in a range of wavelengths from 1460 nm, and preferably from 1300 nm;
- it has a theoretical cut-off wavelength less than or equal to 1850 nm and preferably less than or equal to 1800 nm;
- it has an effective surface area greater than or equal to 45 $\mu m^2$ at a wavelength of 1460 nm;
- it has curvature losses less than or equal to 400 dB/m at a wavelength of 1625 nm, and preferably at a wavelength of 1675 nm, when wound onto a 10 mm radius former;
- it has curvature losses less than 0.5 dB, and preferably less than $5 \times 10^{-2}$ dB, at a wavelength of 1625 nm, and preferably at a wavelength of 1675 nm, when 100 turns are wound onto a 30 mm radius former;
- it has a polarization modal dispersion less than or equal to 0.1 $ps/km^{1/2}$, and preferably 0.05 $ps/km^{1/2}$, at a wavelength of 1550 nm;
- it has an attenuation of less than 0.24 dB/km, or even less than 0.22 dB/km, at a wavelength of 1550 nm;
- it has a ratio of the square of the effective surface area to the chromatic dispersion slope greater than or equal to 80 000 $\mu m^4$.nm.km/ps at a wavelength of 1550 nm; and
- it has a sensitivity to microcurvatures less than 1, and preferably less than 0.8, at a wavelength of 1550 nm.

One embodiment of the fiber has a trapezium or rectangle with buried trench and ring index profile which advantageously has one or more of the following characteristics:

- the difference ($\Delta n_1$) between the index of the trapezium or the rectangle and the index of the cladding is from $5.9 \times 10^{-3}$ to $7.8 \times 10^{-3}$ and the radius ($r_1$) of the part of the fiber having an index greater than that of the cladding is from 3.5 to 4.5 $\mu m$;
- the difference ($\Delta n_2$) between the index of the depleted trench and the index of the cladding is from $-8 \times 10^{-3}$ to $1 \times 10^{-3}$ and the outside radius ($r_2$) of said trench is from 5.3 to 8.1 $\mu m$;
- the difference ($\Delta n_3$) between the index of the ring and the index of the cladding is from $1 \times 10^{-3}$ to $8 \times 10^{-3}$ and the outside radius ($r_3$) of said ring is from 7.2 to 11.1 $\mu m$;
- the ratio of the inside radius to the outside radius of the trapezium is greater than 0.4;
- the ratio of the inside radius to the outside radius of the trapezium is less than 0.95, or even less than 0.90, and preferably less than 0.8;
- twice the integral of the product of the radius and the index between a zero radius and the outside radius ($r_1$) of the central part of the fiber having an index greater than that of the cladding is from $76 \times 10^{-3}$ to $114 \times 10^{-3}$ $\mu m^2$;
- twice the integral of the index between a zero radius and the outside radius ($r_1$) of the central part of the fiber having an index greater than that of the cladding is from $46 \times 10^{-3}$ to $56 \times 10^{-3}$ $\mu m^2$;
- twice the integral of the product of the radius and the index between the outside radius ($r_1$) of the central part of the fiber having an index higher than that of the cladding and the inside radius ($r_2$) of the ring is from $-170 \times 10^{-3}$ to $-40 \times 10^{-3}$ $\mu m^2$;
- twice the integral of the product of the radius and the index between the inside radius ($r_2$) and the outside radius ($r_3$) of the ring is from $72 \times 10^{-3}$ to $198 \times 10^{-3}$ $\mu m^2$;
- twice the integral of the product of the radius and the index between the outside radius ($r_1$) of the central part of the fiber having an index greater than that of the cladding and the outside radius ($r_3$) of the ring is from $-38 \times 10^{-3}$ to $90 \times 10^{-3}$ $\mu m^2$.

The invention further proposes a wavelength division multiplex transmission system using the above fiber as line fiber.

BRIEF DESCRIPTION OF THE INVENTION

Other features and advantages of the invention will become apparent on reading the following description of embodiments of the invention, which description is given by way of example and with reference to the accompanying drawing, in which.

DETAILED DESCRIPTION OF THE INVENTION

The invention proposes a fiber having, at a wavelength of 1550 nm, a chromatic dispersion from 5 to 11 ps/(nm.km), a ratio of chromatic dispersion to chromatic dispersion slope from 250 to 370 nm, an effective surface area greater than 50 $\mu m^2$ and a derivative of effective surface area with respect to wavelength less than or equal to 0.14%/nm.

The chromatic dispersion is lower than that of an SMF, which limits the length of the dispersion compensating fiber and thus the attenuation due to that fiber; the chromatic dispersion is also sufficiently high to limit distortion between channels. The value of the ratio of chromatic dispersion to chromatic dispersion slope compensates cumulative chromatic dispersion and chromatic dispersion slope in a transmission system fiber using a prior art dispersion compensating fiber of the kind used to compensate dispersion in a stepped index fiber; this value of the ratio also limits chromatic dispersion variations over a wide band of wavelengths. Also, the fiber has an effective surface area slope less than 0.14%/nm, which ensures that effective surface area variations within the range of wavelengths of the transmission system cause small variations in non-linear effects over the range of wavelengths used in the transmission system.

Also, the proposed value of the effective surface area slope avoids the need to treat each wavelength of the transmission system individually. It is therefore advantageous to use a fiber whose dispersion and effective surface area vary little as a function of wavelength. This advantage becomes all the more critical in a situation where transmission over an extended range of wavelengths is required. In the present context, the expression "wide band" means a range of wavelengths covering at least two of the S, C, L and XL bands defined below.

Figure 1:
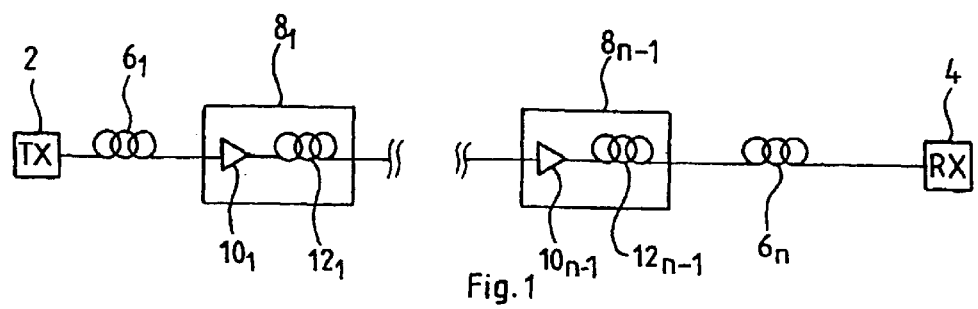
FIG. 1 is a diagrammatic representation of a transmission system.

FIG. 1 is a diagrammatic representation of a wavelength division multiplex transmission system. FIG. 1 shows the transmitter TX 2 and the receiver RX 4 of the transmission system, with the line fiber between them. The line fiber is formed of sections $6_1$ to $6_n$ separated by repeaters $8_1$ to $8_{n-1}$; each repeater $8_i$ includes an amplifier $10_i$ whose structure has no effect on the working of the invention and is therefore not described. At the output of the amplifier is a section $12_i$ of dispersion compensating fiber. Placing the dispersion compensating fiber downstream of the amplifier limits the effects of high attenuation in the fiber. The FIG. 1 transmission system can be modified: thus filters, an amplifier downstream of the dispersion compensating fiber, etc. can be provided. The dispersion compensating fiber could also be used as line fiber, instead of being provided in a repeater.

In a system of the kind shown in FIG. 1, the line fiber can be a NZ-DSF+ of the type described in the document FR-A-2 790 107, which has a chromatic dispersion close to 8 ps/(nm.km). The document FR-A-2 795 828 proposes the following example for compensating chromatic dispersion in this kind of fiber: at a wavelength of 1550 nm, the line fiber has a chromatic dispersion of 8 ps/(nm.km) and a chromatic dispersion slope of 0.055 ps/(nm$^2$.km). The ratio of chromatic dispersion to chromatic dispersion slope is 145 nm. Also, at a wavelength of 1550 nm, the dispersion compensating fiber has a chromatic dispersion close to −51 ps/(nm.km) and a chromatic dispersion slope of −0.035 ps/(nm$^2$.km), and thus the same ratio of chromatic dispersion to chromatic dispersion slope (145 nm). In this example, 14 km of dispersion compensating fiber compensates 86 km of line fiber.

The line fiber in the FIG. 1 example can also be a fiber from example 20 in Table 1 below; at a wavelength of 1550 nm, that fiber has the propagation characteristics indicated in Table 2 below, namely:

a chromatic dispersion of 8 ps/(nm.km), and a chromatic dispersion slope of 0.031 ps/(nm$^2$.km).

As the ratio C/C' of chromatic dispersion to chromatic dispersion slope is close to the ratio C/C' of the stepped index fiber, it is possible to compensate chromatic dispersion using the kind of dispersion compensating fiber used in the prior art to compensate chromatic dispersion in an SMF; in particular, LUCENT DK series (DK-40; DK-60; DK-80) dispersion compensating fibers can be used, providing from 80% to 120% of compensation for an SMF having, at 1550 nm, a dispersion of 17 ps/(nm.km) and a slope of 0.055 ps/(nm$^2$.km), which corresponds to a dispersion to slope ratio from 250 nm to 370 nm.

Moreover, the fiber from example 20 from Table 1 has an effective surface area slope of 0.13%/nm at a wavelength of 1550 nm, which is less than that of the TeraLight fiber considered by way of comparison. For the Table 1 fiber, the effective surface area variations are therefore less in the range of wavelengths used in the transmission system. In the example of a wavelength division multiplex transmission system operating in band C, i.e. from 1530 to 1565 nm, the effective surface area variations over the bandwidth of the TeraLight fiber considered by way of comparative example are of the order of −3.2% to +2.5%; for the fiber from Table 1 considered in this comparison, the variations are from −2.5 to +2.0%.

The term "L band" refers to the range of wavelengths above the C band, up to wavelengths of the order of 1620 or 1625 nm. The term "S band" refers to the range of wavelengths below the C band, down to wavelengths of the order of 1460 to 1530 nm. The term "XL band" refers to the range of wavelengths above the L band, up to wavelengths of the order of 1675 nm.

A transmission system operating in the S, C, L and XL bands therefore typically uses wavelengths from 1460 to 1675 nm. In this kind of system, the effective surface area variations over the bandwidth in the TeraLight fiber considered by way of comparative example are of the order of −13.5% to +23.7%; for the fiber from Table 1 considered in this comparison, the variations are from −10.3 to +20.1%.

For all the channels of the band from 1460 to 1675 nm, and for a given power per channel, in the fiber of the invention variations in non-linear effects are of an amplitude comparable to those obtained in a TeraLight fiber in a band from 1484 to 1657 nm. It is therefore possible to use the fiber of the invention over a wider band without having to modify existing equipment.

In addition to the features mentioned above, it is advantageous for the fiber to have one or more of the following features:

monomode in-cable behavior at least from 1460 nm and preferably for wavelengths greater than or equal to 1300 nm;

an effective surface area greater than or equal to 50 $\mu m^2$ at a wavelength of 1550 nm;

an effective surface area greater than or equal to 45 $\mu m^2$ at a wavelength of 1460 nm;

a chromatic dispersion cancellation wavelength $\lambda_0$ less than or equal to 1370 nm;

curvature losses less than 400 dB/m for a wavelength less than 1625 nm, and preferably less than 1675 nm, when the fiber is wound onto a 10 mm radius former;

curvature losses less than 0.5 dB and preferably less than $5 \times 10^{-2}$ dB for a wavelength less than 1675 nm, when 100 turns are wound onto a 30 mm radius former;

a sensitivity to microcurvatures less than or equal to 1, and preferably less than or equal to 0.8, at a wavelength of 1550 nm;

a polarization modal dispersion less than or equal to 0.1 ps/km$^{1/2}$, and preferably less than or equal to 0.05 ps/km$^{1/2}$, at a wavelength of 1550 nm; and an attenuation less than 0.24 dB/km, and preferably less than 0.22 dB/km, at a wavelength of 1550 nm.

The fact that the fiber exhibits monomode behavior in cable for wavelengths greater than 1460 nm, and even at 1300 nm, enables monomode propagation of the channels of the multiplex. ITU-T Recommendation G.650 defines the in-cable cut-off wavelength. The theoretical cut-off wavelength of the fiber is generally several hundred nanometers greater than the in-cable cut-off wavelength. In fact, it appears that propagation in an in-cable optical fiber can be monomode even if the theoretical cut-off wavelength is greater than the wavelength of the signals used: in fact, beyond a distance of a few meters or tens or meters, which is small compared to the propagation distances of optical fiber transmission networks, the secondary modes disappear because of excessive attenuation. Propagation in the transmission system is then monomode. This criterion could therefore be replaced by a theoretical cut-off wavelength criterion, and the theoretical cut-off wavelength could be less than 1850 nm, or even less than 1800 nm.

The proposed limit on the effective surface area ensures that non-linear effects in the line fiber remain acceptable over the range of wavelengths used in the transmission system.

The limit on the chromatic dispersion cancellation wavelength ensures that chromatic dispersion is not canceled in the range of wavelengths used in the transmission system and also limits non-linear effects in that range.

The limits on curvature losses and microcurvature losses in particular enable satisfactory behavior of the fiber when it is integrated into a cable. Note that curvature losses are an increasing function of wavelength and that the proposed limits amount to applying limits over the whole of the range of wavelengths. These limits are representative of the in-cable capability of the fiber. The sensitivity to curvatures is evaluated as explained in ITU-T Recommendation G.650, by measuring the attenuation caused by winding 100 turns of fiber onto a 30 mm radius former or by winding the fiber onto a 10 mm radius former. The sensitivity to microcurvatures is measured in a manner that is known in the art; as in what follows, it can be measured relative to a fiber such as the applicant's ASMF 200 fiber. The above constraints are preferably complied with throughout the range of wavelengths used in the transmission system.

The fiber advantageously also has a polarization modal dispersion less than or equal to 0.1 ps/km$^{1/2}$ as measured in the vicinity of a wavelength of 1550 nm, which ensures good transmission at high bit rates.

The fiber can also have an attenuation less than 0.24 dB/km, or even 0.22 dB/km, as measured in the vicinity of a wavelength of 1550 nm, which limits losses in the fiber.

Examples of fibers matching the above specifications are given next, respectively with a trapezium and ring index profile and a rectangle and ring index profile.

The fiber can have the FIG. 2 index profile, with the values given in the tables hereinafter. The FIG. 2 set point index profile is a trapezium with buried trench and ring profile. Starting from the center of the fiber, it has:

a central part with a substantially constant index greater than or equal to the index of the cladding, a part with an index decreasing in a substantially linear manner from the aforementioned substantially constant index greater than or equal to the index of the cladding to an index less than or equal to the index of the cladding, and an annular part having a substantially constant index less than or equal to the index of the cladding, the combination constituting a "trapezium with buried or depleted trench" index profile.

Figure 2:
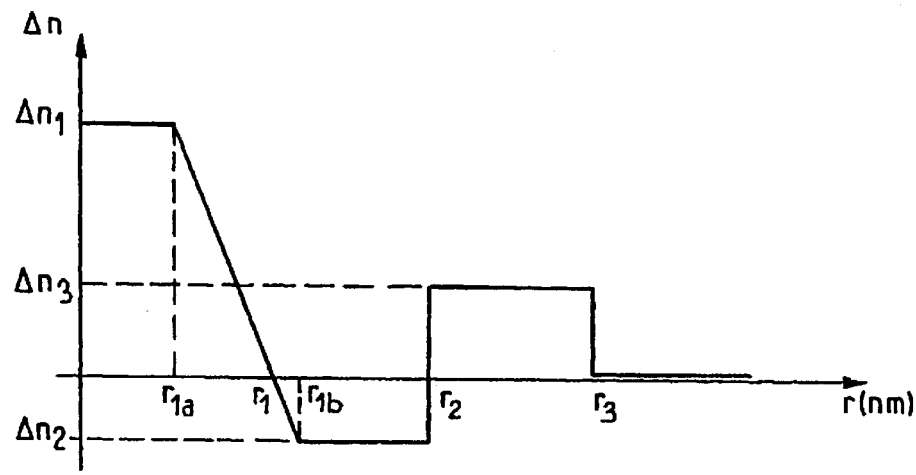
FIG. 2 is a diagrammatic representation of a set point index profile of a first embodiment of a fiber in accordance with the invention.

The FIG. 2 fiber has a ring around the buried trench, i.e. a part whose index is greater than the index of the cladding, whence the use of the expression "trapezium with buried trench and ring" index profile.

A rectangular with buried trench and ring index profile can also be used, in which case, in contrast to the trapezium and ring index profile, the fiber has:

a central part with a substantially constant index greater than or equal to the index of the cladding, and an annular part having a substantially constant index less than or equal to the index of the cladding, the combination constituting a "rectangle with buried or depleted trench" index profile, surrounded by a ring.

In what follows, $\Delta n_1$ denotes the difference between the index of the central part and the index of the cladding of the fiber, $\Delta n_2$ denotes the difference between the index of the buried trench and the index of the cladding of the fiber, and $\Delta n_3$ denotes the difference between the index of the ring and the index of the cladding of the fiber. As explained above, $\Delta n_1$ and $\Delta n_3$ have a positive value and $\Delta n_2$ has a negative value.

The outside radius of the central part of substantially constant index is denoted $r_{1a}$, the inside radius of the buried trench is denoted $r_{1b}$, and the radius of the central part of the fiber having an index greater than the index of the cladding is denoted $r_1$; in the case of a rectangle profile, $r_1$ is the radius of the rectangular central part and the radii $r_{1a}$ and $r_{1b}$ are equal. The expression "shorter base of the trapezium" can also refer to the central part of radius $r_{1a}$ and with a constant index greater than the index of the cladding. The expression "longer base of the trapezium" corresponds to the radius $r_{1b}$ in the figure, and extends out to the inside radius of the trench. The outside radius of the buried part, which is the inside radius of the ring, is denoted $r_2$ and the outside radius of the ring is denoted $r_3$.

Examples of fibers having the above index profile are given in the table below, using the notation defined above.

TABLE 1

| N° | $r_{1a}/r_{1b}$ | $r_1$ (μm) | $r_2$ (μm) | $R_3$ (μm) | $10^3 \Delta n_1$ | $10^3 \Delta n_2$ | $10^3 \Delta n_3$ |
|---|---|---|---|---|---|---|---|
| 1  | 0.56 | 4.1  | 6.5  | 7.85  | 6.85 | −7.9  | 6.5  |
| 2  | 0.84 | 3.75 | 5.65 | 10.25 | 7.25 | −6.2  | 2.15 |
| 3  | 0.86 | 3.9  | 6.1  | 11.1  | 6.65 | −5.6  | 1.5  |
| 4  | 1    | 4.05 | 6.75 | 8.15  | 6.6  | −5.5  | 6.95 |
| 5  | 1    | 3.69 | 6.02 | 7.77  | 6.91 | −5.18 | 3.8  |
| 6  | 1    | 3.94 | 6.41 | 9.86  | 6.5  | −4.87 | 1.95 |
| 7  | 1    | 4.13 | 6.74 | 8.7   | 6.08 | −3.65 | 4.26 |
| 8  | 1    | 3.9  | 6.16 | 8.21  | 6.71 | −6.37 | 4.7  |
| 9  | 1    | 4.24 | 6.6  | 9.43  | 6.32 | −5.37 | 3.79 |
| 10 | 1    | 4.19 | 6.99 | 9.32  | 6.2  | −5.27 | 4.65 |
| 11 | 1    | 3.68 | 6.31 | 10.52 | 6.99 | −4.55 | 2.1  |
| 12 | 0.89 | 4.1  | 5.9  | 10    | 6.95 | −6.65 | 2.25 |
| 13 | 0.82 | 3.6  | 7.75 | 9.4   | 7    | −2.3  | 4.75 |
| 14 | 0.69 | 4    | 6.55 | 9.2   | 6.75 | −4.65 | 2.65 |
| 15 | 0.74 | 4.35 | 7.15 | 8.85  | 6.3  | −3.75 | 6.05 |
| 16 | 0.8  | 3.9  | 6.05 | 8.55  | 7.45 | −6.85 | 4.7  |
| 17 | 0.84 | 4    | 8.05 | 9.55  | 6.4  | −2.6  | 6.4  |
| 18 | 0.88 | 4.15 | 6.2  | 9.4   | 6.5  | −7.45 | 3.4  |
| 19 | 0.86 | 3.85 | 6.95 | 8.95  | 6.9  | −4.8  | 5.65 |
| 20 | 0.67 | 4    | 5.85 | 9.15  | 6.75 | −7.35 | 2.55 |
| 21 | 0.7  | 3.9  | 7    | 9.2   | 7.15 | −3.5  | 4.5  |
| 22 | 0.68 | 3.8  | 7.4  | 9.15  | 7.3  | −2.95 | 4.75 |

In the above table, profiles 4 to 11 are rectangle and ring profiles and the other profiles are trapezium and ring profiles.

From the point of view of the profile, the dimensions of the fiber can be chosen by applying one or the more of the conditions set out below; on the one hand, with regard to the central trapezium part, advantageously:

$5.9 \times 10^{-3} \leq \Delta n_1 < 7.8 \times 10^{-3}$, and $3.5 \leq r_1 < 4.5$ μm.

The slope of the flanks of the trapezium is advantageously chosen so that the ratio of the radii $r_{1a}$ and $r_{1b}$ is from 0.4 to 1; the limiting value 1 corresponds in fact to a "rectangle and ring" index profile. The trapezium index profiles have the advantage of a more progressive variation of the index in the vicinity of the center of the fiber; softening the transition between the center of the fiber and the depleted trench in this way is advantageous from the point of view of attenuation. Also, from the point of view of preform fabrication, it is easier to obtain a trapezium index profile than a rectangle index profile. From this point of view, it is therefore beneficial for the ratio to be less than 0.95, or even 0.90. An even more advantageous upper limit is 0.80.

The values of the index difference $\Delta n_2$ and the outside radius $r_2$ for the buried trench can be chosen to verify the following conditions:

$-8 \times 10^{-3} \leq \Delta n_2 \leq -1 \times 10^{-3}$, and $5.3 \leq r_2 \leq 8.1$ μm.

The values of the index difference $\Delta n_3$ and the outside radius $r_3$ for the ring can be chosen to verify the following conditions:

$1 \times 10^{-3} \leq \Delta n_3 \leq 8 \times 10^{-3}$, and $7.2 \leq r_3 \leq 11.1$ μm.

Other ways to characterize the fiber are feasible. Thus the parameter $S_C$ can be used, defined by the following equation:

$$S_C = 2 \cdot \int_0^{r1} \Delta n(r) \cdot r \cdot dr$$

This parameter is homogenous to the product of a surface area by an index. It applies simply to the trapezium index profile and the rectangle index profile and reflects the increased index in the vicinity of the core of the fiber. Its value is preferably from $76 \times 10^{-3}$ and $114 \times 10^{-3}$ μm².

The parameter $L_C$ defined by the following equation:

$$L_C = 2 \cdot \int_0^{r1} \Delta n(r) \cdot dr$$

is homogenous to the product of a radius by an index. This parameter applies simply to the trapezium index profile and the rectangle index profile, and reflects the product of the average value of the index by the radius $r_1$ of the central part; in the case of a rectangle index profile, the value of this parameter is $2\Delta n_1 \cdot r_1$; its value is preferably from $46 \times 10^{-3}$ to $56 \times 10^{-3}$ μm².

The parameter $S_G$ defined by the following equation can also be used:

$$S_G = 2 \cdot \int_{r1}^{r2} \Delta n(r) \cdot r \cdot dr$$

This parameter is also homogeneous to the product of a surface area by an index. It reflects the reduced index in the buried trench. Its value is preferably from $-170 \times 10^{-3}$ to $-40 \times 10^{-3}$ μm².

Similarly, the parameter $S_A$ defined by the following equation:

$$S_A = 2 \cdot \int_{r2}^{r3} \Delta n(r) \cdot r \cdot dr$$

is homogeneous to the product of a surface area by an index and reflects the increased index in the ring. It is preferably from $72 \times 10^{-3}$ to $198 \times 10^{-3}$ μm².

Another feasible parameter is the parameter $S_{GA}$ defined by the following equation:

$$S_{GA} = 2 \cdot \int_{r1}^{r3} \Delta n(r) \cdot r \cdot dr$$

This parameter reflects the average increase in the index over the buried trench and the ring, relative to the index of silica. Its value is preferably from $-38 \times 10^{-3}$ to $90 \times 10^{-3}$ μm².

One of the above parameters, or a combination of several of them, defines the profile of a fiber which can be used as a line fiber.

The Table 1 fibers have the propagation characteristics indicated in Tables 2 and 3 below, for wavelengths of 1460, 1550, 1625 and 1675 nm.

TABLE 2

| N° | $\lambda_{cth}$ nm | $\lambda_0$ nm | $2W_{02}$ μm (1550 nm) | C' ps/nm² – km (1550 nm) | C/C' nm (1550 nm) | $S_{eff}^2/C'$ μm⁴ · nm · km/ps (1550 nm) | $S'_{eff}$ (%/nm) (1550 nm) | $S_{μc}$ (1550 nm) |
|---|---|---|---|---|---|---|---|---|
| 1 | 1500 | 1325 | 8.15 | 0.034 | 320 | 81000 | 0.11 | <0.6 |
| 2 | 1800 | 1370 | 8 | 0.023 | 250 | 113000 | 0.14 | <0.6 |
| 3 | 1760 | 1330 | 8.1 | 0.026 | 360 | 106000 | 0.12 | <0.8 |
| 4 | 1660 | 1320 | 8.15 | 0.034 | 330 | 85000 | 0.11 | <0.5 |
| 5 | 1400 | 1360 | 8.05 | 0.031 | 260 | 85000 | 0.12 | <0.8 |
| 6 | 1630 | 1320 | 8.2 | 0.032 | 340 | 92000 | 0.11 | <0.7 |
| 7 | 1630 | 1340 | 9 | 0.044 | 250 | 97000 | 0.12 | <0.8 |
| 8 | 1630 | 1350 | 8.2 | 0.03 | 270 | 100000 | 0.13 | <0.8 |
| 9 | 1800 | 1330 | 8.7 | 0.037 | 300 | 104000 | 0.12 | <0.6 |
| 10 | 1800 | 1320 | 8.55 | 0.032 | 340 | 113000 | 0.12 | <0.8 |
| 11 | 1800 | 1340 | 7.95 | 0.023 | 345 | 114000 | 0.13 | <0.7 |
| 12 | 1790 | 1320 | 8.2 | 0.034 | 320 | 87000 | 0.11 | <0.4 |
| 13 | 1740 | 1365 | 8.2 | 0.031 | 255 | 89000 | 0.13 | <0.8 |
| 14 | 1590 | 1335 | 8.2 | 0.033 | 305 | 85000 | 0.11 | <0.7 |
| 15 | 1760 | 1335 | 9 | 0.042 | 260 | 99000 | 0.12 | <0.6 |
| 16 | 1780 | 1350 | 7.95 | 0.029 | 270 | 91000 | 0.13 | <0.3 |
| 17 | 1840 | 1335 | 8.65 | 0.035 | 295 | 99000 | 0.12 | <0.7 |
| 18 | 1780 | 1325 | 8.35 | 0.028 | 335 | 115000 | 0.12 | <0.7 |
| 19 | 1810 | 1340 | 8.1 | 0.024 | 330 | 119000 | 0.13 | <0.6 |
| 20 | 1640 | 1355 | 8.3 | 0.031 | 260 | 96000 | 0.13 | <0.8 |
| 21 | 1790 | 1350 | 8.2 | 0.031 | 270 | 90000 | 0.13 | <0.5 |
| 22 | 1740 | 1360 | 8.05 | 0.029 | 270 | 86000 | 0.13 | <0.6 |

TABLE 3

| N° | $S_{eff}$ $\mu m^2$ (1460 nm) | $S_{eff}$ $\mu m^2$ (1550 nm) | $S_{eff}$ $\mu m^2$ (1625 nm) | $S_{eff}$ $\mu m^2$ (1675 nm) | C ps/(nm·km) (1460 nm) | C ps/(nm·km) (1550 nm) | C ps/(nm·km) (1625 nm) | C ps/nm·km) (1675 nm) | PC10mm dB/km (1550 nm) | PC10mm dB/m (1625 nm) | PC10mm dB/m (1675 nm) | PC30mm dB (1550 nm) | PC30mm dB (1625 nm) | PC30mm dB (1675 nm) |
|---|---|---|---|---|---|---|---|---|---|---|---|---|---|---|
| 1 | 47.9 | 52.6 | 57.4 | 61.2 | 7.3 | 10.8 | 13.2 | 14.6 | 4 | 20 | 48 | $<10^{-5}$ | $<2.10^{-4}$ | $<5.10^{-3}$ |
| 2 | 45.8 | 51.3 | 57.4 | 62.5 | 3.4 | 5.8 | 7.5 | 8.7 | 6 | 30 | 74 | $<10^{-5}$ | $<10^{-4}$ | $<2.10^{-3}$ |
| 3 | 47.7 | 52.4 | 57.6 | 62 | 6.5 | 9.4 | 11.1 | 12 | 15 | 66 | 150 | $<2.10^{-5}$ | $<2.10^{-3}$ | $<5.10^{-2}$ |
| 4 | 49.6 | 54.2 | 59 | 62.9 | 7.5 | 11.0 | 13.4 | 14.9 | 3 | 14 | 35 | $<10^{-5}$ | $<10^{-5}$ | $<2.10^{-4}$ |
| 5 | 46.6 | 51.7 | 57.1 | 61.5 | 4.7 | 7.9 | 10.2 | 11.6 | 13 | 60 | 139 | $<2.10^{-5}$ | $<2.10^{-3}$ | $<5.10^{-2}$ |
| 6 | 49.7 | 54.4 | 59.3 | 63.3 | 7.6 | 10.9 | 13.1 | 14.4 | 14 | 62 | 164 | $<2.10^{-5}$ | $<2.10^{-3}$ | $<2.10^{-2}$ |
| 7 | 58.7 | 65 | 71.6 | 76.7 | 6.8 | 10.9 | 14.1 | 16.2 | 11 | 40 | 100 | $<10^{-5}$ | $<5.10^{-4}$ | $<5.10^{-3}$ |
| 8 | 49.3 | 54.9 | 61 | 65.9 | 4.9 | 7.9 | 10.1 | 11.6 | 11 | 46 | 129 | $<10^{-5}$ | $<10^{-3}$ | $<10^{-2}$ |
| 9 | 56 | 61.7 | 67.8 | 72.7 | 7.3 | 10.9 | 13.6 | 15.3 | 7 | 28 | 64 | $<10^{-5}$ | $<5.10^{-5}$ | $<5.10^{-4}$ |
| 10 | 54.5 | 60 | 66 | 70.9 | 7.6 | 10.9 | 13.2 | 14.6 | 17 | 66 | 117 | $<10^{-5}$ | $<5.10^{-4}$ | $<10^{-2}$ |
| 11 | 45.9 | 50.9 | 56.3 | 60.9 | 5.3 | 7.8 | 9.3 | 10.2 | 11 | 53 | 130 | $<10^{-5}$ | $<10^{-3}$ | $<2.10^{-2}$ |
| 12 | 49.9 | 54.6 | 59.4 | 63.3 | 7.5 | 10.9 | 13.3 | 14.8 | 1.1 | 6 | 16 | $<10^{-5}$ | $<10^{-5}$ | $<2.10^{-5}$ |
| 13 | 46.7 | 52.1 | 58 | 62.7 | 4.6 | 7.8 | 9.9 | 11.3 | 13 | 57 | 130 | $<2.10^{-5}$ | $<2.10^{-3}$ | $<2.10^{-2}$ |
| 14 | 48.1 | 52.9 | 58 | 62.1 | 6.7 | 10.1 | 12.3 | 13.7 | 11 | 48 | 110 | $<10^{-5}$ | $<10^{-3}$ | $<2.10^{-2}$ |
| 15 | 58.4 | 64.9 | 71.5 | 76.7 | 7 | 11.1 | 14.2 | 16.3 | 5 | 21 | 45 | $<10^{-5}$ | $<5.10^{-5}$ | $<5.10^{-4}$ |
| 16 | 46.5 | 51.6 | 57.2 | 61.6 | 5 | 7.9 | 10 | 11.5 | 0.8 | 5 | 13 | $<10^{-5}$ | $<10^{-5}$ | $<10^{-5}$ |
| 17 | 53.5 | 59.2 | 65.3 | 70.2 | 6.9 | 10.5 | 13 | 14.6 | 11 | 44 | 97 | $<10^{-5}$ | $<5.10^{-4}$ | $<5.10^{-3}$ |
| 18 | 51.6 | 57.1 | 63.1 | 68 | 6.6 | 9.5 | 11.5 | 12.8 | 10 | 43 | 100 | $<10^{-5}$ | $<2.10^{-4}$ | $<5.10^{-3}$ |
| 19 | 47.8 | 53.3 | 59.3 | 64.4 | 5.3 | 7.9 | 9.6 | 10.7 | 7 | 35 | 83 | $<10^{-5}$ | $<2.10^{-4}$ | $<5.10^{-3}$ |
| 20 | 49 | 54.6 | 60.7 | 65.7 | 4.9 | 8 | 10.2 | 11.7 | 11 | 47 | 105 | $<10^{-5}$ | $<10^{-3}$ | $<2.10^{-2}$ |
| 21 | 47.6 | 52.9 | 58.7 | 63.3 | 5.2 | 8.4 | 10.6 | 12.1 | 4 | 20 | 50 | $<10^{-5}$ | $<5.10^{-5}$ | $<10^{-3}$ |
| 22 | 45.1 | 50.2 | 55.6 | 60.1 | 4.9 | 7.9 | 9.9 | 11.2 | 9 | 45 | 110 | $<10^{-5}$ | $<5.10^{-4}$ | $<10^{-2}$ |

In Table 2, $\lambda_{cth}$ is the theoretical cut-off wavelength of the fiber, expressed in nanometers; in practice, the cut-off wavelength measured in-cable is several hundred nm lower; clearly the fiber is effectively monomode in the range of wavelengths of the wanted signals, in particular in the C and L bands, but more generally from 1300 to 1675 nm.

$\lambda_0$ is the chromatic dispersion cancellation wavelength, expressed in nanometers. $2W_{02}$ is the mode diameter, expressed in micrometers. C is the chromatic dispersion, expressed in ps/(nm.km). C' is the dispersion slope, i.e. the derivative of the chromatic dispersion with respect to wavelength, expressed in ps/(nm².km); the ratio C/C' of chromatic dispersion to chromatic dispersion slope therefore has the dimension of a wavelength, and is expressed in nanometers. $S_{eff}$ is the effective surface area, expressed in $\mu m^2$, and $S_{eff}^2/C'$ is therefore the ratio of the square of the effective surface area to the chromatic dispersion slope; this parameter reflects the compromise required between the effective surface area (which should be as large as possible) and the chromatic dispersion slope (which should be as low as possible). $S'_{eff}$ is the derivative of the effective surface area with respect to wavelength, at a wavelength of 1550 nm; it is expressed in %/nm, and is calculated by dividing the derivative $dS_{eff}/d\lambda$ of the effective surface area with respect to wavelength at a wavelength of 1550 nm by the value $S_{eff}$ of the effective surface area at that wavelength; it is referred to interchangeably as the "effective surface area slope" or the "effective surface area derivative". Finally, $S\mu c$ is a dimensionless coefficient reflecting the sensitivity of the fiber to microcurvatures; in the table, this coefficient is measured relative to the applicant's ASMF 200 prior art fiber. This coefficient can be measured by the prior art method of crushing the fiber between two grids.

The various parameters were all measured at 1550 nm, with the exception of the cut-off wavelength and the chromatic dispersion cancellation wavelength, of course, which are not measured for a specific value of wavelength. The measured optical parameters of the fiber at 1550 nm reflect the values of the various parameters throughout the range of use of the fiber, allowing in particular for low values of chromatic dispersion slope and effective surface area.

Table 3 gives, for various wavelengths, the values of the effective surface area $S_{eff}$ in $\mu m^2$, the chromatic dispersion C in ps/(nm.km), and the curvature losses measured as indicated above for 10 and 30 mm radius formers.

The tables show that the Table 1 fibers have propagation characteristics (chromatic dispersion, ratio of chromatic dispersion to chromatic dispersion slope and effective surface area slope) enabling them to be used as line fibers in an optical fiber transmission system, with conventional compensating fiber suitable for SMF. Table 3 shows that the fibers have suitable values over the whole range of wavelengths envisaged, from 1460 to 1675 nm.

In all the examples from Table 1, variations of 5% in the index $\Delta n_1$ or of 10% in the indexes $\Delta n_2$, $\Delta n_3$ and $\Delta n_4$ yielded similar results. Likewise varying the radii relative to the values given for the examples in Table 1, by 10% for $r_1$, $r_2$ and by 5% for $r_3$, yielded similar results.

Figure 3:
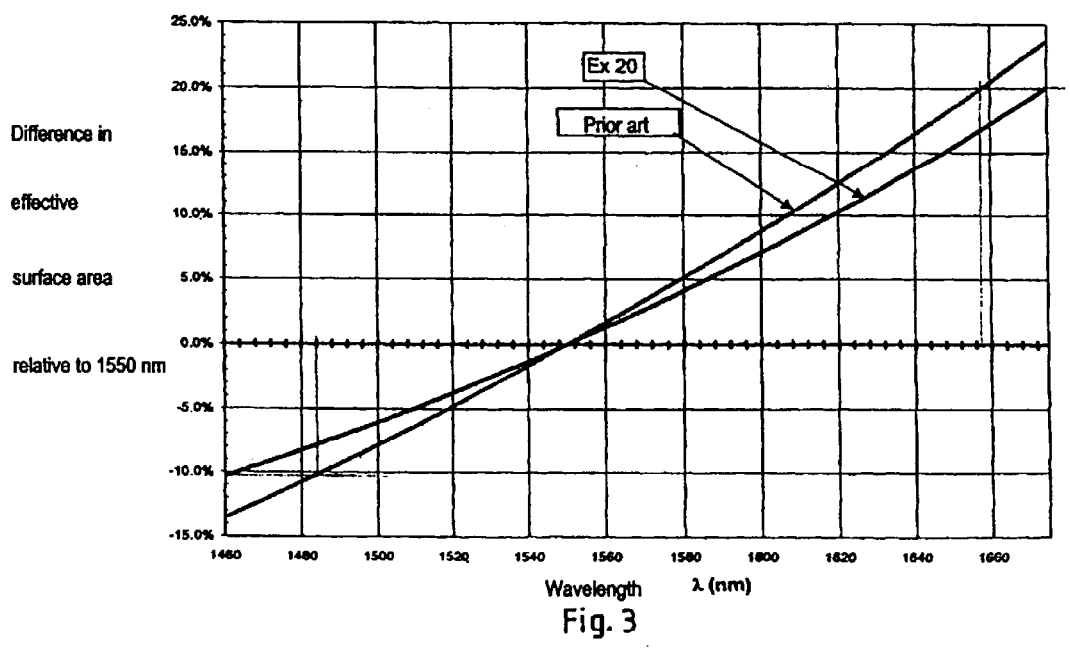
FIG. 3 is a graph showing the evolution, relative to 1550 nm, of the effective surface area as a function of wavelength for a fiber according to the invention and a prior art fiber.

FIG. 3 is a graph comparing the use of a fiber according to the invention and the use of a prior art fiber. Wavelength is plotted on the abscissa axis and the difference between the effective surface area and its value at a wavelength of 1550 nm is plotted on the ordinate axis. The curve marked "Ex. 20" corresponds to the fiber from example 20 above; it has an effective surface area slope of 0.13%/nm. The curve marked "prior art" corresponds to the applicant's TeraLight fiber, which is described in French patent application FR-A-2 790 107 and has an effective surface area slope of 0.17%/nm at a wavelength of 1550 nm. The graph shows clearly that the effective surface area variation for transmission from 1460 to 1675 nm is greater in the prior art than in the method according to the invention. The variations relative to the value at 1550 nm are −13.5% to +23.7% with the prior art fiber. They are only −10.3% to +20.1% using the method of the invention. In terms of transmission range, the method of the invention enables transmission at a range of wavelengths from 1460 to 1675 nm, with the same relative fluctuations in effective surface area as a TeraLight fiber in a range from 1484 to 1657 nm, i.e. a bandwidth gain of 42 nm.

It is therefore possible to transmit signals over an extended range of wavelengths without individually treating each wavelength of the transmission system. From the point of view of non-linear effects, the system designer does not have to worry about the wavelength; sources can be used having identical characteristics for all the channels, identical channel spacing over the whole range of wavelengths, and identical bit rates per channel.

Of course, the present invention is not limited to the examples and embodiments described and shown, but lends itself to many variants that will be evident to the skilled person. Thus profiles other than those proposed in the examples in the table could be used, or other system configurations than that shown in FIG. 1.

What is claimed is:

1. An optical fiber having, at a wavelength of 1550 nm, a chromatic dispersion C from 5 to 11 ps/(nm.km), a ratio C/C' of chromatic dispersion to chromatic dispersion slope from 250 to 370 nm, a derivative $S'_{eff}$ of effective surface area with respect to wavelength less than 0.14%/nm, a chromatic dispersion cancellation wavelength $\lambda_0$ less than or equal to 1370 nm and an effective surface area greater than or equal to 50 $\mu$m.

2. The fiber of claim 1, characterized in that it exhibits monomode behavior in-cable in a range of wavelengths from 1460 nm, and preferably from 1300 nm.

3. The fiber of claim 1, characterized in that it has a theoretical cut-off wavelength less than or equal to 1850 nm and preferably less than or equal to 1800 nm.

4. The fiber of claim 1, characterized in that it has an effective surface area greater than or equal to 45 $\mu$m$^2$ at a wavelength of 1460 nm.

5. The fiber of claim 1, characterized in that it has curvature losses less than or equal to 400 dB/m at a wavelength of 1625 nm, and preferably at a wavelength of 1675 nm, when wound around a 10 mm radius former.

6. The fiber of claim 1, characterized in that it has curvature losses less than 0.5 dB, and preferably less than $5 \times 10^{-2}$ dB, at a wavelength of 1625 nm, and preferably at a wavelength of 1675 nm, when 100 turns are wound onto a 30 mm radius former.

7. The fiber of claim 1, characterized in that it has a polarization modal dispersion less than or equal to 0.1 ps/km$^{1/2}$, and preferably 0.05 ps/km$^{1/2}$, at a wavelength of 1550 nm.

8. The fiber of claim 1, characterized in that it has an attenuation of less than 0.24 dB/km, or even less than 0.22 dB/km, at a wavelength of 1550 nm.

9. The fiber of claim 1, characterized in that it has a ratio of the square of effective surface area to chromatic dispersion slope greater than or equal to 80,000 $\mu$m$^4$.nm.km/ps at a wavelength of 1550 nm.

10. The fiber of claim 1, characterized in that it has a sensitivity to microcurvatures less than 1, and preferably less than 0.8, at a wavelength of 1550 nm.

11. The fiber of claim 1, characterized in that it has a trapezium or rectangle with buried trench and ring index profile.

12. The fiber of claim 11, characterized in that the difference ($\Delta n_1$) between the index of the trapezium or the rectangle and the index of the cladding is from $5.9 \times 10^{-3}$ to $7.8 \times 10^{-3}$ and in that the radius ($r_1$) of the part of the fiber having an index greater than that of the cladding is from 3.5 to 4.5 $\mu$m.

13. The fiber of claim 11, characterized in that the difference ($\Delta n_2$) between the index of the depleted trench and the index of the cladding is from $-8 \times 10^{-3}$ to $-1 \times 10^{-3}$, and in that the outside radius ($r_2$) of said trench is from 5.3 to 8.1 $\mu$m.

14. The fiber of claim 11, characterized in that the difference ($\Delta n_3$) between the index of the ring and the index of the cladding is from $1 \times 10^{-3}$ to $8 \times 10^{-3}$ and in that the outside radius ($r_3$) of said ring is from 7.2 to 11.1 $\mu$m.

15. The fiber of claim 11, characterized in that the ratio between the inside radius and the outside radius of the trapezium is greater than 0.4.

16. The fiber of claim 11, characterized in that the ratio between the inside radius and the outside radius of the trapezium is less than 0.95, even less than 0.90, and preferably less than 0.8.

17. The fiber of claim 11, characterized in that twice the integral of the product of the radius and the index between a zero radius and the outside radius ($r_1$) of the central part of the fiber having an index greater than that of the cladding is from $76 \times 10^{-3}$ to $114 \times 10^{-3}$ $\mu$m$^2$.

18. The fiber of claim 11, characterized in that twice the integral of the index between a zero radius and the outside radius ($r_1$) of the central part of the fiber having an index greater than that of the cladding is from $46 \times 10^{-3}$ to $56 \times 10^{-3}$ $\mu$m$^2$.

19. The fiber of claim 11, characterized in that twice the integral of the product of the radius and the index between the outside radius ($r_1$) of the central part of the fiber having an index higher than that of the cladding and the inside radius ($r_2$) of the ring is from $-170 \times 10^{-3}$ to $-40 \times 10^{-3}$ $\mu$m$^2$.

20. The fiber of claim 11, characterized in that twice the integral of the product of the radius and the index between the inside radius ($r_2$) and the outside radius ($r_3$) of the ring is from $72 \times 10^{-3}$ to $198 \times 10^{-3}$ $\mu$m$^2$.

21. The fiber of claim 11, characterized in that twice the integral of the product of the radius and the index between the outside radius ($r_1$) of the central part of the fiber having an index greater than that of the cladding and the outside radius ($r_3$) of the ring is from $-38 \times 10^{-3}$ to $90 \times 10^{-3}$ $\mu$m$^2$.

22. A wavelength division multiplex transmission system including the fiber according to claim 1 as line fiber.

* * * * *

UNITED STATES PATENT AND TRADEMARK OFFICE
CERTIFICATE OF CORRECTION

PATENT NO. : 6,633,714 B2
DATED : October 14, 2003
INVENTOR(S) : Louis-Anne de Montmorillon et al.

It is certified that error appears in the above-identified patent and that said Letters Patent is hereby corrected as shown below:

<u>Column 13,</u>
Line 21, delete "50 µm" and insert -- 50 µm$^2$ --

Signed and Sealed this

Fifteenth Day of June, 2004

JON W. DUDAS
*Acting Director of the United States Patent and Trademark Office*